Jan. 22, 1963 W. L. ELLIOTT 3,074,138
WARE TURNING AND HANDLING MACHINE
Original Filed June 5, 1957 5 Sheets-Sheet 1

INVENTOR.
Walter L. Elliott
BY
HIS ATTORNEYS

Jan. 22, 1963 W. L. ELLIOTT 3,074,138
WARE TURNING AND HANDLING MACHINE
Original Filed June 5, 1957 5 Sheets-Sheet 2

INVENTOR.
Walter L. Elliott
BY
HIS ATTORNEYS

Jan. 22, 1963 W. L. ELLIOTT 3,074,138
WARE TURNING AND HANDLING MACHINE
Original Filed June 5, 1957 5 Sheets-Sheet 3

INVENTOR.
Walter L. Elliott
BY
HIS ATTORNEYS

INVENTOR.
Walter L. Elliott
HIS ATTORNEYS

Jan. 22, 1963  W. L. ELLIOTT  3,074,138
WARE TURNING AND HANDLING MACHINE
Original Filed June 5, 1957  5 Sheets-Sheet 5

INVENTOR.
Walter L. Elliott
BY
HIS ATTORNEYS

з,074,138
WARE TURNING AND HANDLING MACHINE
Walter L. Elliott, East Liverpool, Ohio, assignor to The Taylor, Smith & Taylor Company, East Liverpool, Ohio, a corporation of Ohio
Original application June 5, 1957, Ser. No. 663,626. Divided and this application July 22, 1960, Ser. No. 51,248
1 Claim. (Cl. 25—22)

The present application relates to the manufacture of hollow earthenware and china articles, particularly cups.

My parent application Serial No. 663,626, filed June 5, 1957, now Patent No. 3,040,409, of which the present application is a division, is primarily addressed to cup turning mechanism used in conjunction with a cup handling machine. Handling, as it is termed, is usually the final operation done with the turned cup material still semi-plastic or green and the union of the handle with the green cup body makes it ready for drying and firing.

In the subject matter to which the present application is addressed, the invention relates to the turntables of the machine, its supporting structure, the ware working mechanism operative by being mechanically actuated due to rotation of the turntable, and the attendant accessory structure. This invention particularly relates to the timed air blast mechanism constituting one of such accessory structures and operating at the right time to discharge waste scraps accumulating during each cup turning operation.

The novel structure provided according to the preceding paragraph has the desirable operating feature that the turntable structure is in continuous motion, turning fairly rapidly and the cups being produced under a sustained rate maintainable approximately at 110 dozen cups per hour. That rate is readily apparent as an increase several-fold over the production rates commonly yielded in production lines.

This invention is primarily adapted for cup manufacturing but it will be understood that the operating principles apply with equal advantage to the making of various chinaware and earthenware articles of a hollow construction requiring the attachment of appendages such as handles, spouts, or other projections in their manufacture.

Further features, objects, and advantages will either be specifically pointed out or become apparent when for a better understanding of the invention, reference is made to the following description taken in conjunction with the accompanying drawings which show a preferred embodiment thereof and in which.

Figure 1:
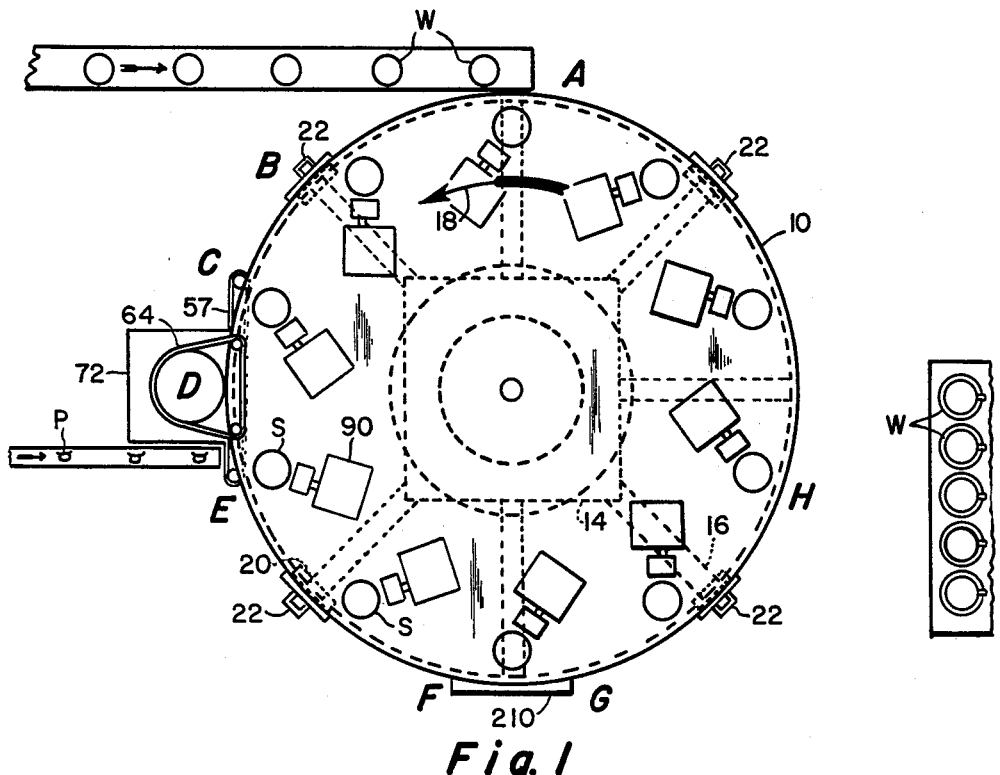
FIGURES 1 and 2 are top plan and front elevational views of my handle sticking machine.
Figure 2:
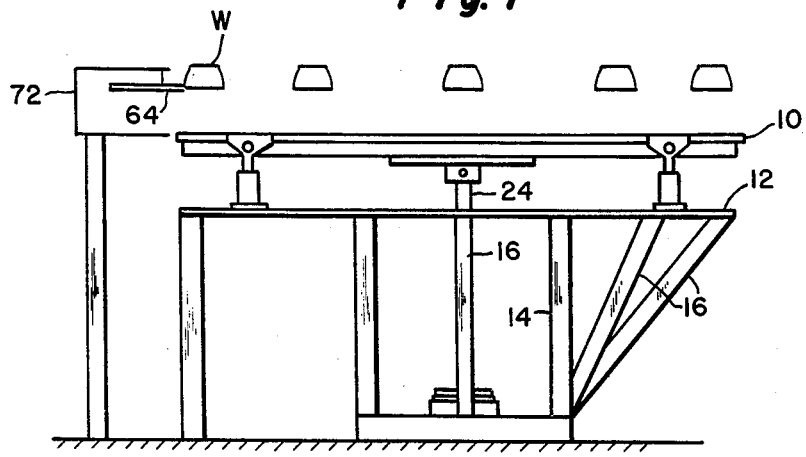
Figure 3:
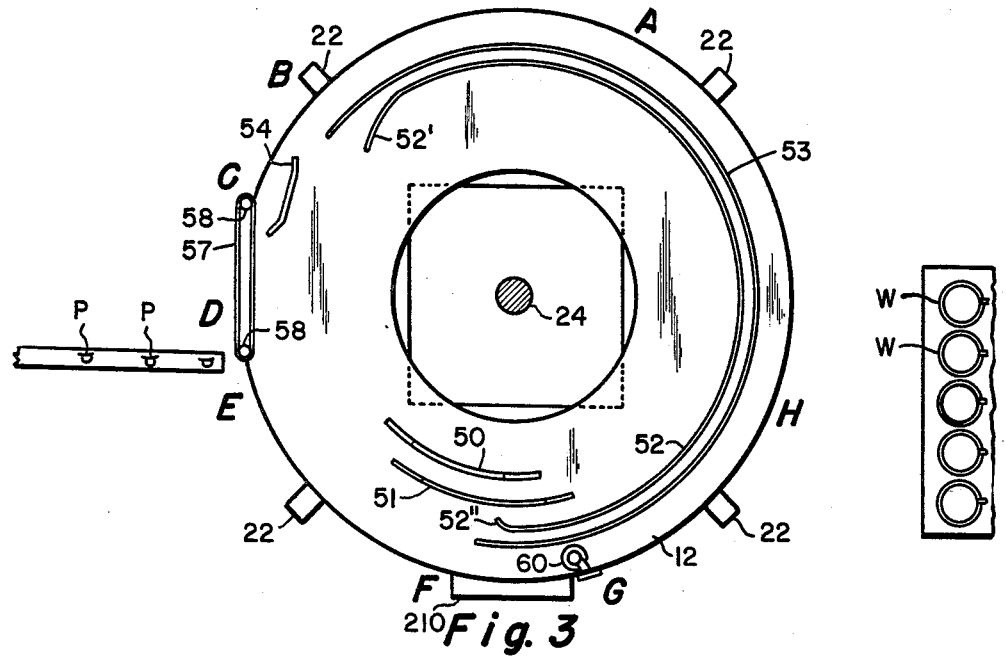
FIGURES 3 and 4 are similar to FIGURES 1 and 2 respectively with certain parts removed or shown in section for clarity.

In FIGURES 1–4, I show a preferred embodiment of my machine adapted to carry a relatively rotatable turntable 10 and a fixed platform 12 which are of circular shape and which are mounted thereon in vertically spaced relationship to one another. A generally upright frame 14 directly supports the platform 12 and has a series of side braces 16 which run diagonally between the base of the frame and the rim of the fixed platform 12. The turntable 10 forms a traveling carrier for ten spaced sets S of fixtures which are mounted to revolve therewith at the periphery and which in brief transfer ware W consisting of green cup bodies from a loading station A through a clamping station B to a cutting station C for trimming the lip of the cup, the table rotation being counterclockwise as indicated by the arrow 18. A station D sponges the passing cups and at E the preformed green handles P are loaded into the fixtures S. The preformed handles P are affixed to the cup bodies at station F and the completed cup still in the semi-plastic or green state is unclamped at G for unloading at the station H. At this station the finished ware W with the handles affixed thereto is ready for drying and firing.

The rim of the turntable 10 runs on a set of four rollers 20 which have fixed axles and which are supported on the platform 12 by means of adjustable supports 22 of the slide rod and set screw type. A vertical drive shaft 24 forms a supporting spindle for the table 10 which is keyed to the latter at 26 and which has its midportion and base mounted to turn respectively in a pilot bearing 28 and in a thrust bearing 30 which are secure in the frame 14. An electric drive motor 32 is connected through a gear speed reducer 34 and a pair of meshing bevel gears 36 to drive the vertical shaft 24. A hub-shaped air manifold 38 at the center of the turntable 10 forms a sealed rotary joint with a center-fed fitting 40 which is stationarily carried by an air supply pipe 42 affixed at its upper end (not shown) to an overhead support. The fitting 40 has one radially extending port 41 which in succession registers with ten ports 44 in the manifold 38, each supplying a radially extending air pipe 46 to blow scavenging air in the direction of the rim of the table to dispose of clay chips.

Figure 4:
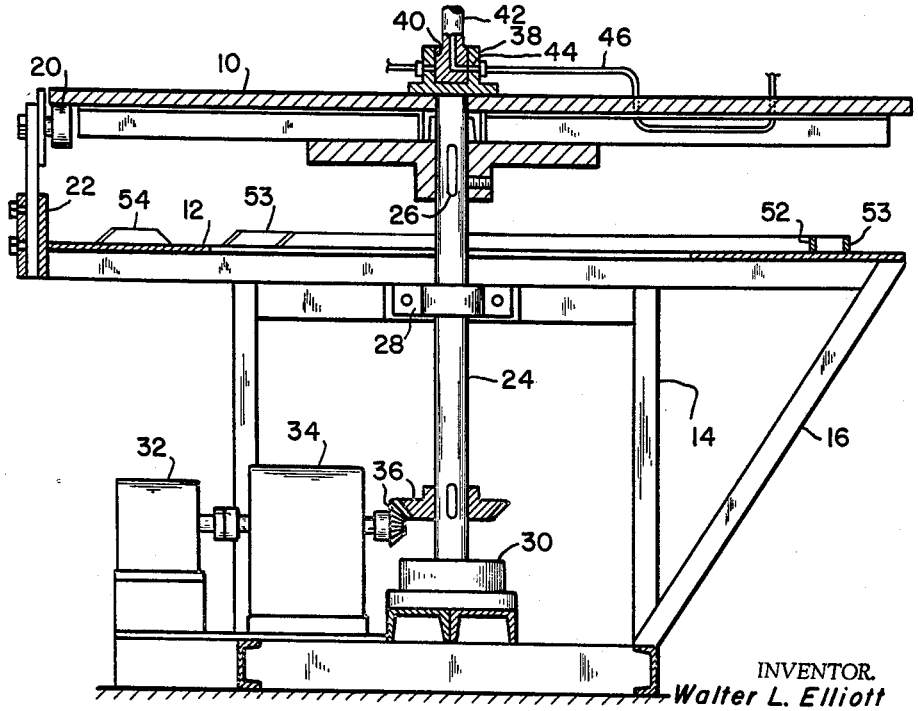
Figure 5:
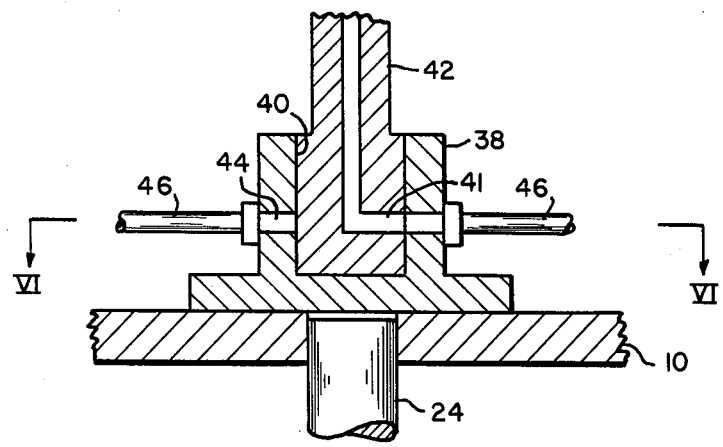
FIGURE 5 is a sectional view, on an enlarged scale, of a portion of FIGURE 4.
Figure 6:
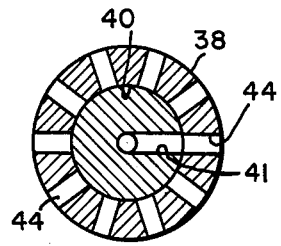
FIGURE 6 is a section taken on the line VI—VI of FIGURE 4.

The fixed platform 12 carries a set of five arcuate cam rails 50, 51, 52, 53, and 54 mounted to its upper surface at different radial distances from the drive shaft 24 (FIGURE 4). The cam rails 50, 51, and 53 respectively, engage three vertically displaceable lift members which operate various ones of the sets S of fixtures in a manner more fully described hereinafter. The cam rails 52 and 54 operate two laterally displaceable operating members in the sets S.

A drive belt 57 disposed adjacent the trimming and sponging stations C and D (FIGURE 3) is trained on fixed sheaves 58 such that the inner flight thereof runs as an encroaching chord on the arc of revolution of the table 10 and assists in the turning and sponging operations hereinafter described. A bumper wheel 60 with its axle fixed to the platform 12 is disposed adjacent the unclamping station G (FIGURE 3) to rotate the cup through a fractional part of a revolution generally after the manner of the drive belt 57 which serves to rotate the cup through multiple revolutions.

Figure 7:
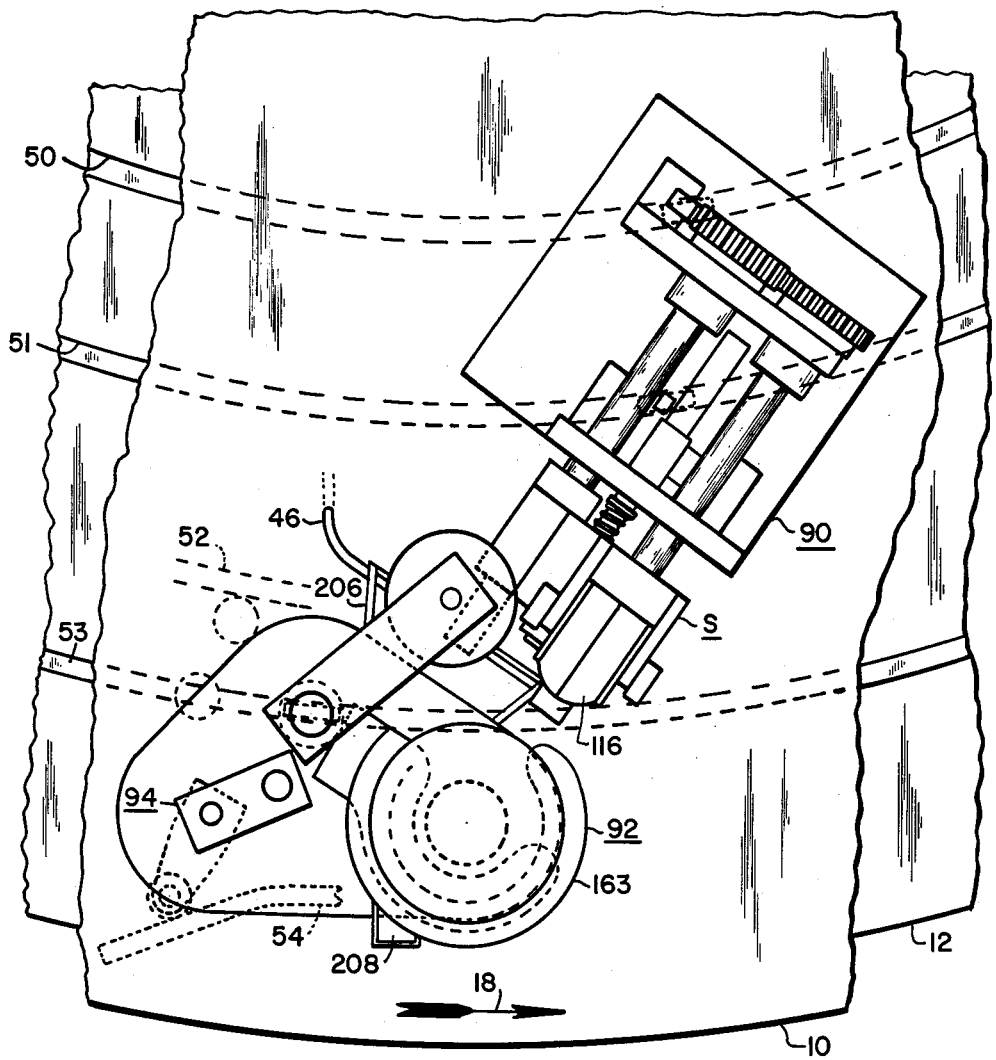
FIGURE 7 is a plan view of one of the sets of fixtures on the table in FIGURE 1.

In FIGURE 7, I show one complete set S of the ten sets of fixtures on the table 10. A handle holder fixture indicated at 90 is operated automatically by means of the two lift cam rails 50 and 51 mounted to the fixed platform 12. A cup supporting fixture is generally indicated at 92 and is automatically operated by means of the lift cam rail 53, and by means of the companion cam 52 which laterally displaces one of the operating members for the cup supporting fixture 92. A cutter fixture 94 operated by the cam rail 54 is used for the turning operation on the cup ware to trim the lip thereof.

Figure 8:
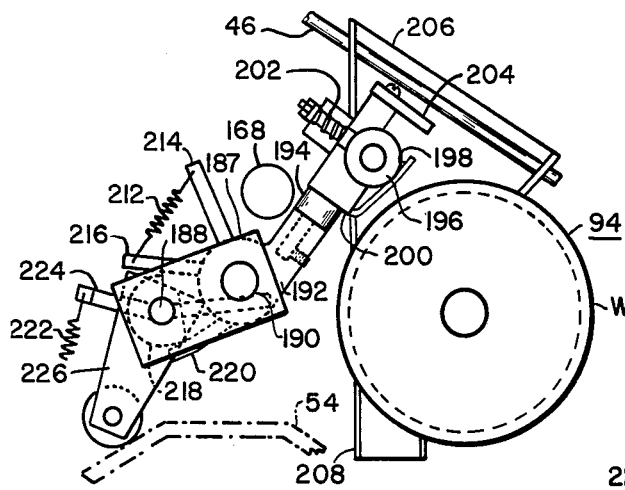
FIGURES 8 and 9 show the cutter fixture respectively in top plan and longitudinal sectional elevation views; and, FIGURE 10 corresponds to FIGURE 8 but shows the cutter in the cutting position.
Figure 9:
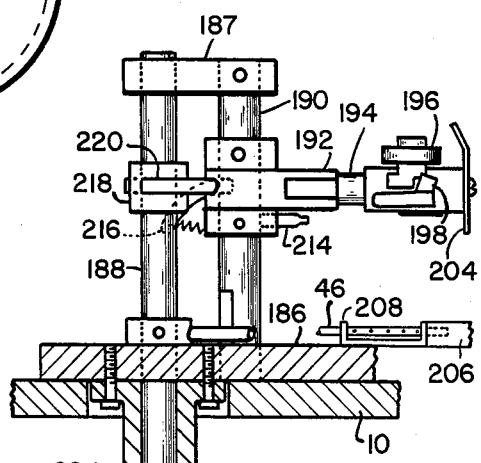
Figure 10:
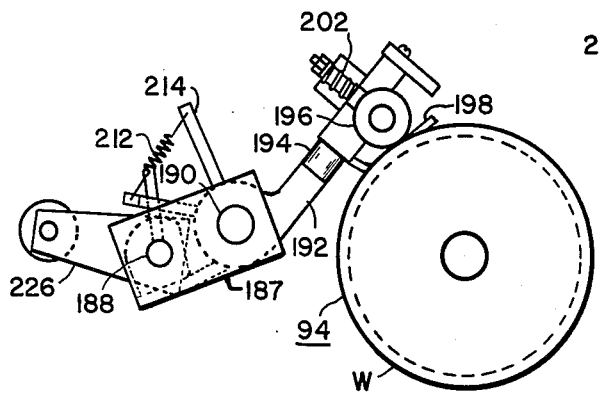

The cutter fixture 94 for trimming the lip of the ware W at station C is more particularly shown in FIGURES 8 through 10. A cover plate 186 mounted across an opening in the table 10 carries a pair of closely spaced vertical rods having a common spacer plate 187 at their upper end and one of which, indicated at 188, is rotatable whereas the other forms a fixed post 190. A swinging cutter arm 192 has a fixed end which encircles the rod 190 and the arm 192 carriers a cutter holder 194 at the swinging end thereof. The cutter holder 194 carries a gauge wheel 196 which is mounted on a fixed vertical axle thereon and which runs on the outer periphery of the ware W being turned in a plane slightly above the lip of the ware. A cutter knife 198 disposed below the gauge wheel 196 is pivotally mounted at 200 to swing relative to the holder 194 and a spring 202 biases the cutter knife 198 in the direction of the ware W. The holder carries a fixed guard 204 at the outer end thereof.

A shallow waste collecting tray 206 (FIGURES 7, 8 and 9) is mounted to the cover plate 186 at a point below the cutter knife 198 of each of the sets of fixtures S and each tray has a wide inner end across which the end length of one of the scavenging air pipes 46 is disposed. Each pipe 46 is plugged at the end and perforated along one side with a series of equidistantly spaced holes (FIGURE 9) to blow over the entire area of the tray. The walls of each tray 206 converge in a radially outwardly direction (FIGURE 7) so as to define a narrow throated chute 208 which at one point in the rotation of the turntable will register with a waste collecting chute shown at 210 in FIGURE 3.

The swinging arm 192 is pivoted into the operating position for cutting by means of a tension spring 212 of which one end is anchored to a fixed anchor 214 and the opposite end pulls on a finger 216 which is rigidly secured to the hub of the arm 192. In that cutting position as shown in FIGURE 10 the spring 212 holds the gauge wheel 196 solidly against the ware W and the spring 202 lightly biases the cutting knife 198 against the lip of the ware W to trim sharp edges from it. A cutter retracting cam 218 has a nose portion thereon engaging a cam follower finger 220 affixed to the hub of the arm 192.

A tension spring 222 acts on a finger 224 fixed to the rotatable rod 188 to bias the cutter retracting cam 218 into the operative position with its nose engaging the cam follower 220 on the arm 192. However, another cam follower 226 makes it possible for the nose of the cam 218 to be automatically rotated to an inoperative position no longer blocking the cam follower 220, the first mentioned cam follower 226 being fast to the lower end of the rod 188 and carrying a roller that runs on the short cam rail 54 on the platform 12. Thus in FIGURE 8 when the ramp of the cam 54 engages the roller on the follower 226 it moves the retracting cam to inoperative position whereupon the cutting knife 198 assumes the solid line position of FIGURE 10 and the cutter blade does not retract until the follower 226 runs off the cam 54 at the flank on its opposite end.

As previously stated, the lip of a cup W is trimmed at station C by cutter 198. The resulting scraps fall into the tray 206 located near that particular cutter. Upon further rotation of the turntable 10, the individual trays 206 containing scraps successively come into registry with the waste collecting chute 210. As each tray 206 registers with the chute 210, a blast of air from one of the pipes 46 blows the scraps from the tray into the chute.

It is noted that the drive belt 57 of FIGURE 1 and the endless belt thereabove having the sponge facing 64 are power driven so as to run continuously and it is further noted that the cams 50, 51, 52, 53 and 54 provide for automatic operation of the turntable 10 as it is continuously rotated by the drive shaft 24 of FIGURE 4. The effective rate of output of this automatic machine therefore depends solely on a convenient running rate for the two loading operators at the stations A and E of FIGURE 1 and the unloading operation at station H. With this machine a very satifactory rate has been established with an output of approximately 110 dozen cups per hour, but this particular output is given purely by way of example and it can be varied faster or slower depending on the experience and effectiveness of the operators themselves.

I have shown a preferred embodiment of my invention but it is to be understood that it may be otherwise embodied within the scope of the following claim.

I claim:

In a ware turning and handling machine, the combination of a fixed platform and a rotatable turntable having a common frame for mounting said platform and said turntable in vertically spaced apart relation to one another in the machine, a drive spindle in said frame mounted to rotate said table in continuous motion about a vertical axis, a plurality of sets of ware working fixtures supported on said table to travel therewith, fixture actuating means carried in part on said table and in part on said fixed platform so as to be responsive to table rotation and connected to said plurality of sets of fixtures to cause them to perform working operations as the table rotates, each set of said fixtures including a ware support, a cutter for trimming ware, a waste collecting tray supported by said turntable for each of said sets of fixtures for receiving ware scraps cut by said cutters, a chute fixed to the frame of the machine for receiving ware scraps from each of said waste collecting trays as it registers with said chute, an annular air manifold coaxial with said spindle and having an air outlet for each of said sets of fixtures, a fitting non-rotatably mounted in said annular air manifold and having a radially extending port which in succession registers with the air outlets in said annular manifold as the turntable rotates, means for supplying air to said port, a plurality of radially extending air distribution pipes each connected at one end to one of the outlets in said annular air manifold and each having a portion thereof located adjacent one of said waste collecting trays for directing a blast of air on the tray as it registers with said chute to blow ware scraps from the tray into said chute.

References Cited in the file of this patent

UNITED STATES PATENTS

| | | |
|---|---|---|
| 917,627 | Lizotte | Apr. 6, 1909 |
| 1,174,349 | Reynolds | Mar. 7, 1916 |
| 1,317,809 | Motz | Oct. 7, 1919 |
| 2,255,615 | Frankel | Sept. 9, 1941 |
| 2,361,687 | Hermani | Oct. 31, 1944 |
| 2,390,118 | Murch | Dec. 4, 1945 |
| 2,628,382 | Fechheimer | Feb. 17, 1953 |